(12) United States Patent
Carlson et al.

(10) Patent No.: US 10,359,022 B2
(45) Date of Patent: Jul. 23, 2019

(54) DUAL AIRCRAFT IGNITION SYSTEM

(71) Applicant: Proplink LP, Azle, TX (US)

(72) Inventors: Thomas C. Carlson, Azle, TX (US); Bradley D. Dement, Azle, TX (US)

( * ) Notice: Subject to any disclaimer, the term of this patent is extended or adjusted under 35 U.S.C. 154(b) by 0 days.

(21) Appl. No.: 15/821,583

(22) Filed: Nov. 22, 2017

(65) Prior Publication Data
US 2018/0142665 A1    May 24, 2018

Related U.S. Application Data

(60) Provisional application No. 62/425,479, filed on Nov. 22, 2016.

(51) Int. Cl.
| | | |
|---|---|---|
| *F02P 15/08* | (2006.01) | |
| *F02P 17/02* | (2006.01) | |
| *B64D 31/04* | (2006.01) | |
| *F02P 7/07* | (2006.01) | |
| *F02P 5/15* | (2006.01) | |

(52) U.S. Cl.
CPC ............. *F02P 15/08* (2013.01); *B64D 31/04* (2013.01); *F02P 7/07* (2013.01); *F02P 17/02* (2013.01); *F02P 5/1502* (2013.01)

(58) Field of Classification Search
CPC .... F02P 5/15; F02P 5/1502; F02P 7/07; F02P 15/08; F02P 17/02; B64D 31/04
USPC ......... 123/196 E, 647, 406.58; 701/102–105
See application file for complete search history.

(56) References Cited

U.S. PATENT DOCUMENTS

| | | | | |
|---|---|---|---|---|
| 4,983,886 A | * | 1/1991 | Balland | F02P 3/0884 |
| | | | | 315/209 CD |
| 5,875,763 A | | 3/1999 | Mottier et al. | |
| 2002/0053790 A1 | * | 5/2002 | Long | B60R 21/01564 |
| | | | | 280/742 |
| 2002/0166519 A1 | * | 11/2002 | Skrzypchak | F01P 3/12 |
| | | | | 123/41.31 |
| 2006/0130811 A1 | | 6/2006 | Carlson et al. | |

* cited by examiner

*Primary Examiner* — Hung Q Nguyen
*Assistant Examiner* — Johnny H Hoang
(74) *Attorney, Agent, or Firm* — Macheledt Bales LLP; Jennifer L. Bales

(57) ABSTRACT

A dual ignition system for aircraft that includes a left and right ignition element, each having a primary module and a secondary module, both operational. A switch mechanism activated by a cockpit control panel selects either the primary mode or the secondary mode for each ignition element. The primary modules could be variable mode modules and the secondary modules could be fixed mode modules. Each module includes a sense magnet responsive to a drive shaft to detect engine position. Each fixed module has a sensor cluster activated by the sense magnet and each variable module has a position encoder activated by the sense magnet.

15 Claims, 5 Drawing Sheets

DUAL AIRCRAFT IGNITION SYSTEM

BACKGROUND OF THE INVENTION

Field of the Invention

The present invention relates to redundant ignition systems for aircraft. In particular, the present invention relates to an ON/ON ignition system including a pilot control panel and two ignition elements each having a primary mode and a secondary mode, wherein the pilot can choose the primary mode or the secondary mode for the first ignition, and can choose the primary mode or the secondary mode for the second ignition, all directly from the control panel.

Discussion of Related Art

Aviation has long enjoyed the services of traditional mechanical magnetos. They've served as long as they primarily because they operate independent of the electrical bus. That said, by modern standards magnetos are far from ideal. They lag in terms of reliability, mechanical complexity, maintenance, and efficiency. Nevertheless, their self-powering feature is an essential and compelling component for aviation, and the other shortcomings have been tolerated due to the absence of an attractive alternative.

Applications that require two ignitions, such as aviation engines, are traditionally tested by alternately turning ignitions OFF and back ON. All pilots are familiar with the cockpit "ON/OFF" ignition switches—one for each ignition. This switch pair has an absolutely essential, role as the sole means of testing and, if necessary, isolating a faulty or failing ignition. This ON/OFF test configuration is wholly satisfactory and appropriate for ground based pre-flight testing where conditions are controlled, planned, and well-rehearsed.

However, extending this routine to in-flight testing is problematic. Pilot training helps, but most will freely admit to a heightened sense of alert and ill-ease, even with routine practice tests. Actual in-flight emergencies are neither controlled nor planned. Emergency in-flight ON/OFF testing is problematic for one simple reason—it turns ignitions OFF. Any shortage of altitude, airspeed, or time will dramatically increase pilot stress, especially with low-time or less practiced operators. Hesitation and indecision can, quite literally, be a pilot's mortal enemy. At its core, ON/OFF testing is a tools problem—not a training problem.

Previous attempts to create a backup ignition system exist. For example, U.S. Pat. No. 5,875,763 to Mottier et al. teaches a system that automatically switches from an electronic ignition module to a magneto when it detects that aircraft bus power has been interrupted. This system has several disadvantages. The pilot cannot switch between modules for testing purposes—the only action the pilot can take is to pull a breaker to the electronic side which is supposed to trigger the system to switch to the magnetos. The pilot may not know which ignition system is being used at a given time. Since one of the ignition systems is a magneto, all the disadvantages and limitations of magnetos exist—e.g. mechanical parts that wear out, a mechanical start mode, and a spark plug gap that is much smaller than that available with electronic systems.

A need remains in the art for a dual ignition system that provides pilot controlled ON/ON operation and testing in addition to existing ON/OFF control.

SUMMARY OF THE INVENTION

It is an object of the present invention to provide a dual ignition system that supplements ON/OFF testing with a quicker and easier ON/ON test alternative operated from the cockpit.

A dual ignition system, according to the present invention, replaces both the left and right magnetos of a conventional ignition system with a left and a right ignition element, each ignition element having two independent, parallel ignition modes (primary mode and secondary mode). Each ignition element has its own separate engine position tracking and control logic circuit—the most complex part of any ignition. A cockpit control panel switch allows selection between the primary mode and the secondary mode separately for each ignition element.

As an example, the primary mode comprises a variable firing logic circuit and the secondary mode comprises fixed firing logic circuit which serves as a backup. Each ignition has a connection to bus power as well as its own internal dynamo as a means of generating independent electrical power, with automatic switching between the two sources.

A system according to one embodiment of the present invention has quadruple redundant control logic, based on two separate platforms: VARIABLE mode in Left, VARIABLE mode in Right, FIXED mode in Left, and FIXED mode in Right. The two modes derive engine position from common, or independent, signal magnets that are mechanically attached to the engine.

The variable firing logic circuit allows high-resolution digital position tracking, processor based variable ignition timing, keyed on RPM and MAP inputs, and customer configurable variable range boundaries:

MIN—high power (less advance).

MAX—cruise power (more advance).

Electrical operating power is triple redundant. An internal alternator in Left is source #1, an internal alternator in Right is source #2, and both are connected to the aircraft bus as source #3.

The system provides simple and instantaneous cockpit (pilot manipulated) switching at a control panel to provide verification or operational remedy in the event of fault in either ignition.

Some embodiments of the present invention utilize a single double pole switch that simultaneously switches the control circuits of both ignitions from one mode to the other mode. In both switch positions, both ignitions remain operational. From the operator standpoint, this type of ON/ON test is far faster, easier, and less stressful than the ON/OFF test in common use.

A preferred embodiment utilizes the existing P-lead or "kill" switch wire for signaling from the ON/ON cockpit control switch. Adding or removing a bias resistance to this wire can invoke a selection of the other mode. This simplifies installation and eliminates requirements for an additional wiring and additional inputs to the ignition.

DETAILED DESCRIPTION

The following table lists elements of the present invention along with their reference numbers.

TABLE 1

| Reference Number | Element |
| --- | --- |
| 102 | Conventional ignition control panel |
| 108 | ON/OFF signal to left magneto |
| 110 | ON/OFF signal to right magneto |
| 120 | Left magneto |
| 122 | Right magneto |
| 124 | Left spark plug(s) |
| 126 | Right spark plug(s) |
| 200 | Pilot combination control panel |
| 202 | SafT Switch control panel |
| 204 | Left ignition element switch |
| 206 | Right ignition element switch |
| 208 | Left ignition control signal |
| 210 | Right ignition control signal |
| 220 | Left ignition element |
| 222 | Right ignition element |
| 250 | Ignition system |
| 302 | Primary mode module |
| 304 | Position encoder |
| 306 | Sensing magnet |
| 308 | Secondary mode module |
| 310 | Sensing magnet |
| 312 | Sensing cluster |
| 320 | Engine coupling |
| 400 | Powering and position device |
| 402 | Drive shaft |
| 404 | Shaft support bearings |
| 406 | Alternator winding |
| 410 | Power magnets |

Figure 1:
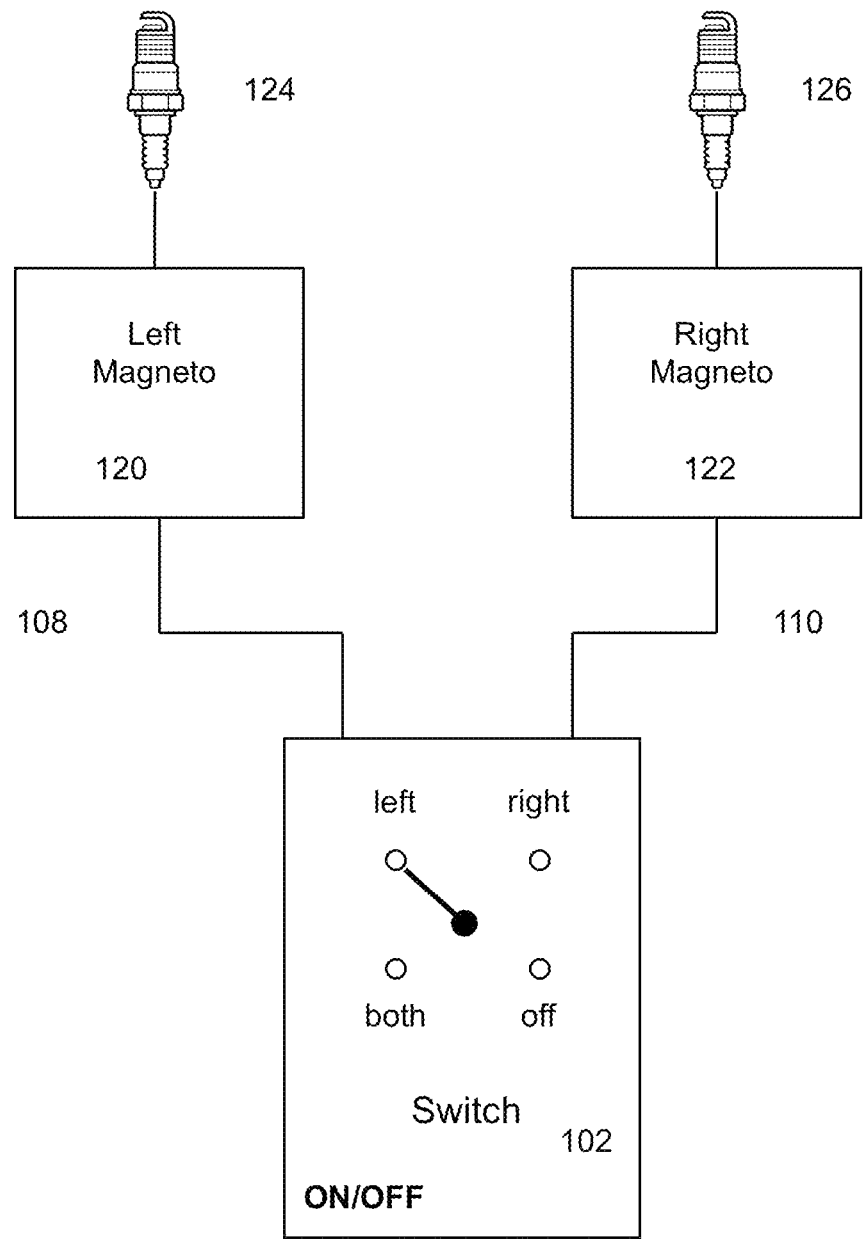
FIG. 1 (Prior Art) is a schematic diagram of a conventional dual aircraft ignition.

FIG. 1 (Prior Art) is a schematic diagram of a conventional dual aircraft ignition system, using a left magneto 120 and a right magneto 122 connected to driving spark plugs 124, 126 (one each pictured). The pilot traditionally uses a switch 102 to choose the left magneto only, right magneto only, both on, or both off. The aviation engine is tested by alternately turning ignitions OFF and back ON, and then isolating a faulty ignition, if found, by turning it OFF.

Figure 2A:
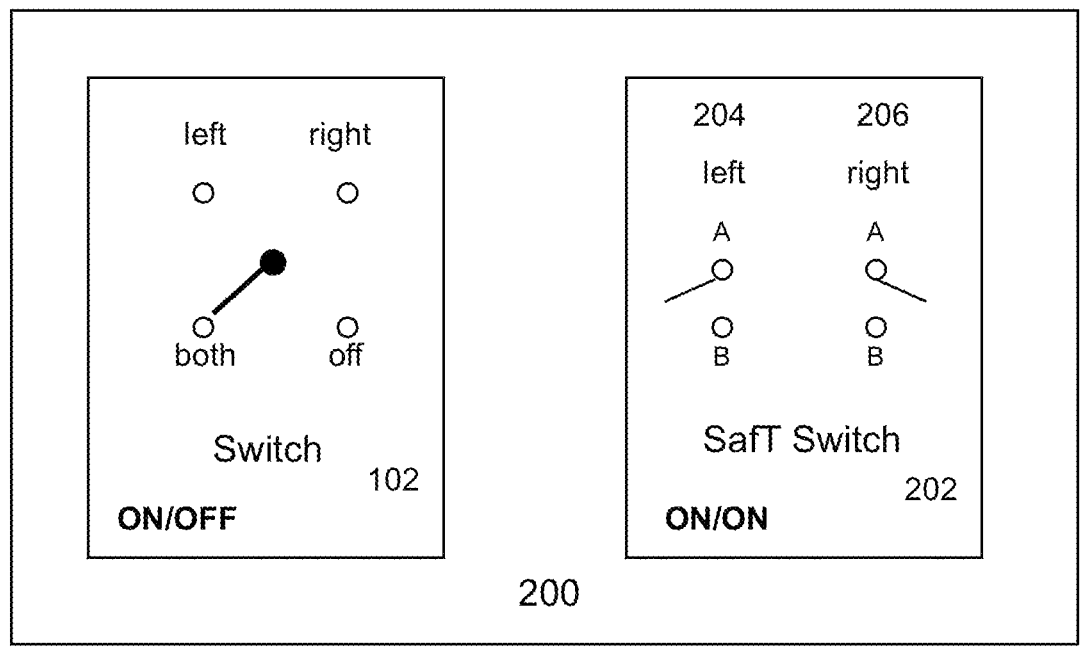
FIG. 2A is a schematic diagram of a control panel for the dual aircraft ignition system according to the present invention.

FIG. 2A is a diagram of a cockpit control panel 200 according to the present invention. The pilot (not shown) leaves the convention control panel 102 in the "both" position, and uses the new control panel 202 (called the SafT switch) to choose the primary mode or the secondary mode for left ignition element 220 and to choose the primary mode or the secondary mode for right ignition element 222 (see FIG. 2B). Here the primary mode is labelled "A" and the secondary mode is labeled "B". Both primary and secondary modes are ON selections. One useful embodiment has the primary mode being a variable mode and the secondary mode being a fixed mode (see FIG. 3).

Figure 2B:
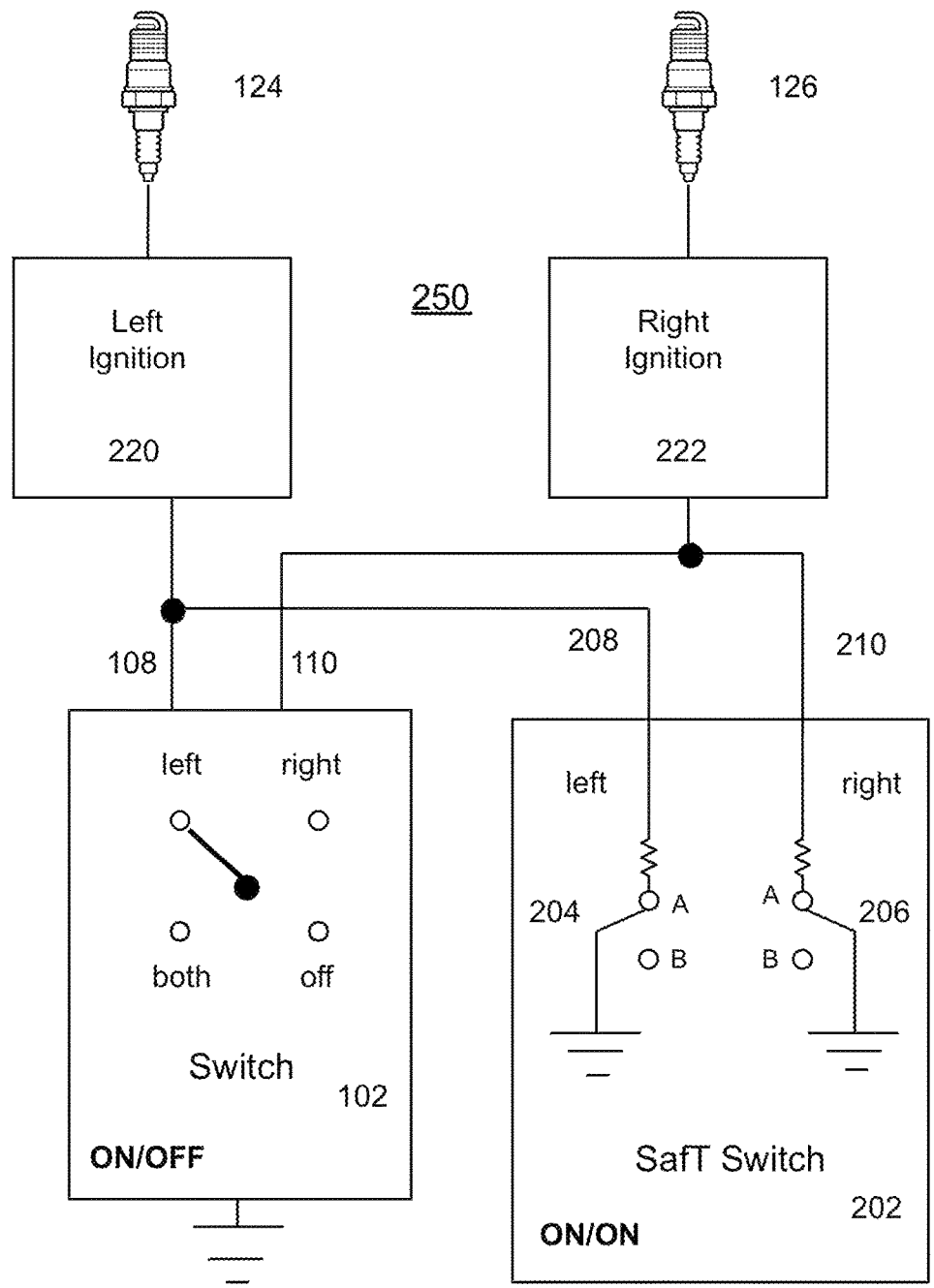
FIG. 2B is a schematic diagram of the dual aircraft ignition system according to the present invention.

FIG. 2B is a high-level schematic diagram of dual aircraft ignition system 250. Magnetos 120, 122 are replaced by ignition elements 220, 222. Each ignition element 220, 222 has two separate tracking and control modes: primary and secondary (see in FIG. 3). This requires an additional control panel 202 having two switches 204 and 206, as each ignition element 220, 222 can be switched into primary mode or secondary mode separately. For example, switches 204, 206 can choose fixed mode or variable mode for left ignition element 220 and switch 202 can choose fixed mode or variable mode for right ignition element 222.

As an alternative, switches 204 and 206 could comprise a single switch with multiple positions.

This diagram of control panel 202 shows an example of retrofitting the present invention into a conventional ignition control setup. A preferred embodiment uses the existing aircraft P-lead or "kill" switch wire 208, 210 for signaling from control panel 202. Adding or removing a bias resistance to this wire can invoke mode selection. This simplifies installation and eliminates requirements for an additional wiring and additional inputs to the ignition.

Control panel 202 is generally used as an addition or supplement to the traditional left/right/both/off switch 102, allowing for ON/OFF testing as needed. Some embodiments include a single double pole switch that simultaneously switches ignition elements 220, 222 from one module to the other module (e.g. both to fixed or both to variable). In both switch positions, both ignitions remain operational—i.e. the ON/ON test.

Figure 3:
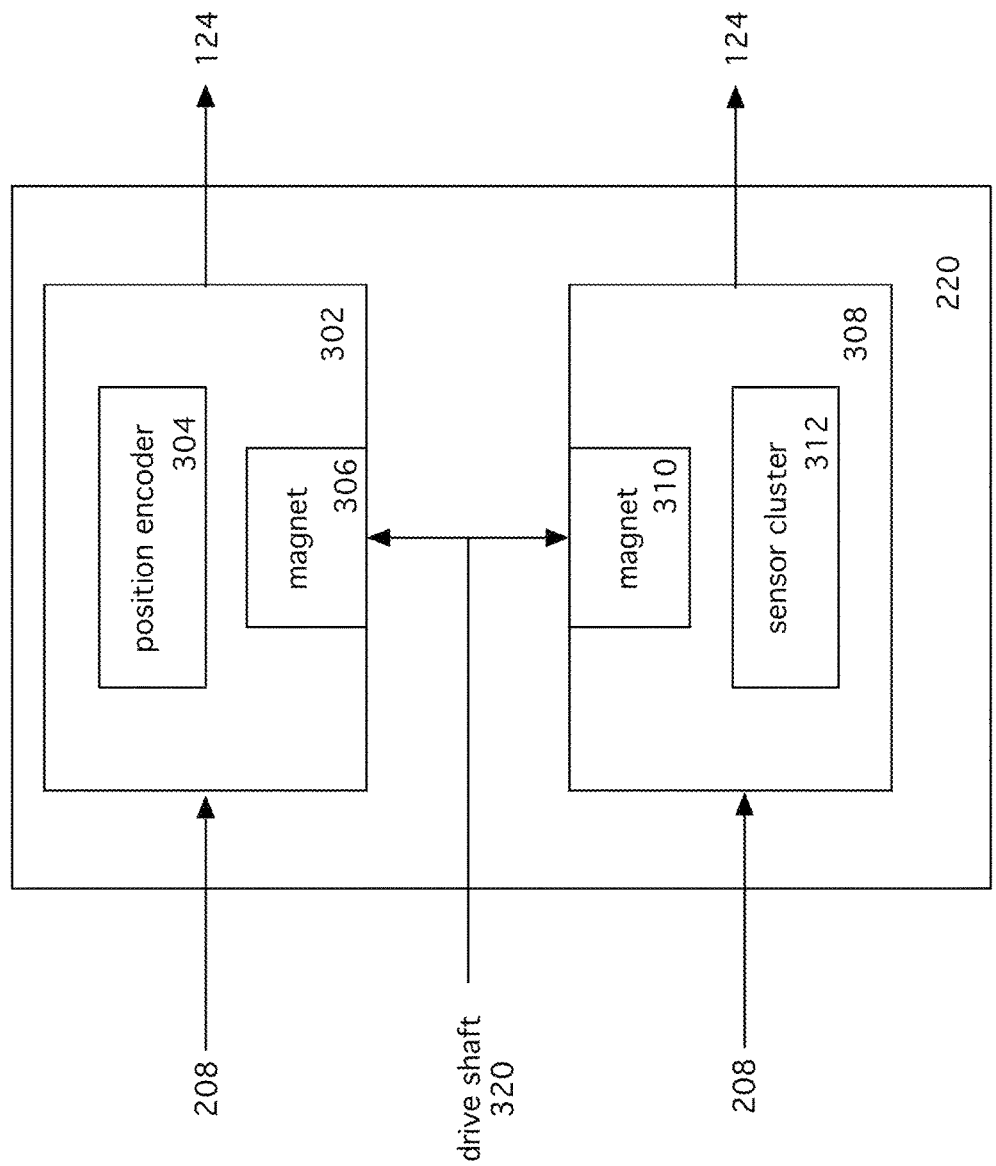
FIG. 3 is a block diagram illustrating a single ignition element with a fixed mode and a variable mode according to the present invention.

FIG. 3 is a block diagram illustrating a preferred embodiment of single ignition 220 with a variable mode module 302 and a fixed mode module 308. Note that both modules could be fixed mode or both modules could be variable mode as well.

Fixed Mode 308 and Variable Mode 302 control circuits each rely on their own independent electronic sensors for detecting engine position. In Variable Mode, a high-resolution digital position encoder 304 is used, while Fixed Mode uses a cluster of hall-effect sensors 312, with one hall-effect sensor per trigger circuit. Both types are activated by the movement of a (separate or common) sense magnet 306, 310 [field] that is mounted to the ignitions mechanical section (see FIG. 4), that is in turn driven by the engine crank shaft or accessory drive 320. The sense magnets 306, 310 are mounted to either A) the ignition drive shaft directly, or B) to a geared extension of the drive shaft which is used to establish a useful turn ratio between the engine crank shaft and the sense magnet. For example, four-cylinder ignition drive pads typically turn 1:1 with the engine crank shaft. In this case the sense magnet can be attached to the ignition shaft or the engine crank shaft directly. Six-cylinder magneto drive pads typically turn 1.5:1 (and occasionally other ratios) to the engine crank shaft. In this case the sense magnet is attached to a gear that is driven by the ignition drive shaft. This geared configuration establishes a more convenient turn ratio. In either case there is one magnet field that is polarized laterally, relative to the axis of rotation. In this configuration, the N/S magnetic field rotates A) on the rotational centerline of the encoder, and at the same time B) at the rotational center of a hall-effect cluster. The hall-effect cluster 312 is arranged with each sensor positioned at a suitable interval to provide trigger signals for the engine. Each hall-effect sensor is activated by the sweep of the north or south magnetic field. The combination of an on-axis (encoder) magnetic sensor 304, and off-axis (hall-effect) magnetic sensor 312 allows both types to co-exist on a common mount. Note that there are other off-axis types of encoder sensors that could be used with careful placement to avoid position conflicts with the hall-effect cluster. It's also possible to mount both types on opposing sides of a mount (circuit board) and similarly achieve compatible placement of two sensing systems.

The variable mode module 302 includes high-resolution digital position tracking processor 304 based variable ignition timing (keyed on RPM and MAP inputs), using variable range boundaries. For example, the MIN boundary might be high power (less advance), while the MAX boundary might be cruise power (more advance).

The fixed module 308 adds only a few grams of weight. It requires no additional mechanical wear parts such as bearings, bushings, bolts, nuts, etc. It doesn't add to ignition length, width, or height. The customer can set the FIXED position firing to match engine manufacturer's spec.

By replacing magnetos 120, ignition element 220 removes many mechanical parts (brushes, points, cams, oils seals, distributor and gears, impulse arms, pins, and spacers). The only mechanical parts are a main shaft and a signal gear.

Figure 4:
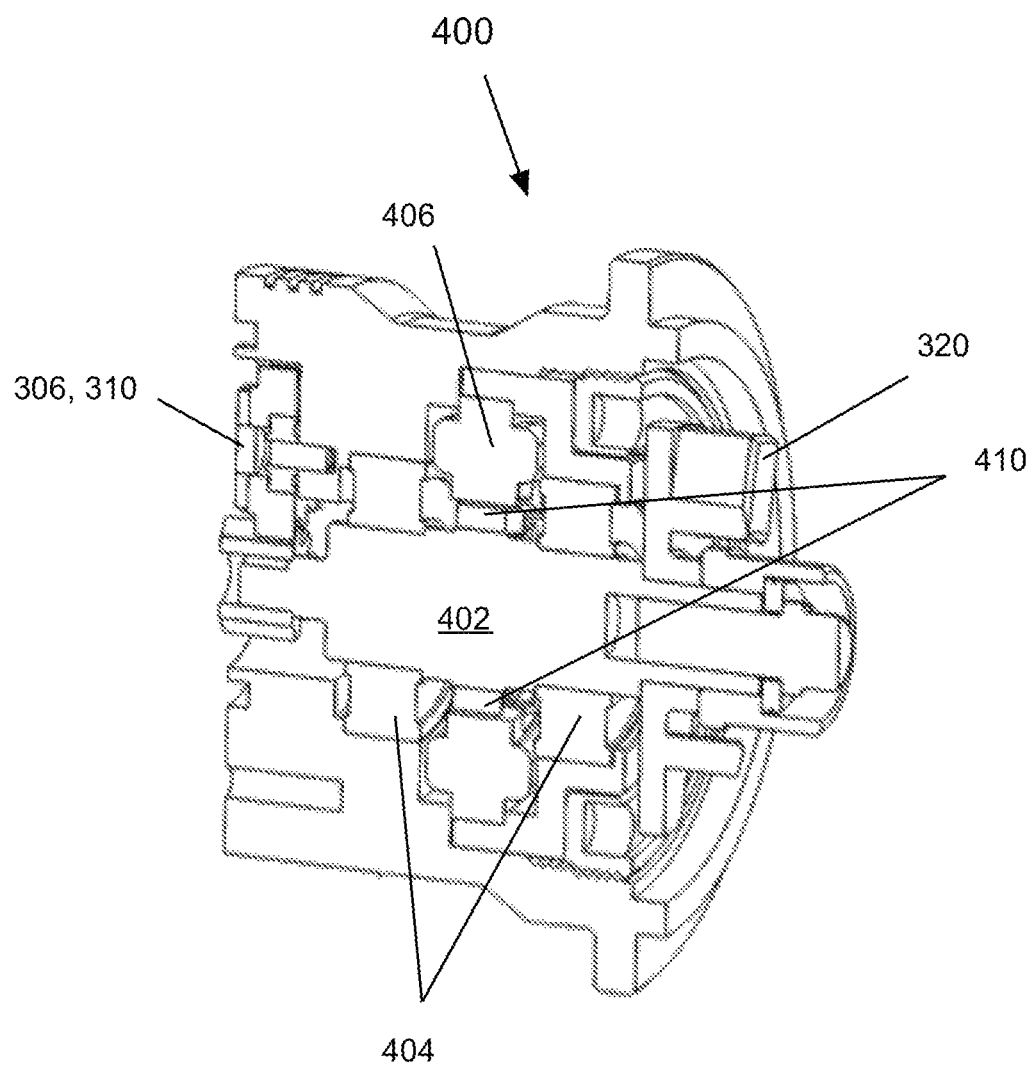
FIG. 4 is a cutaway view of a powering and position device according to the present invention useful in an ignition element.

FIG. 4 is a cutaway view of a powering and position device 400 according to the present invention useful in an ignition element 220, 222. Referring to FIG. 3, magnet 306, 310 is common and mounted, in this example, on the reduction gear drive. Device 400 uses power magnets 410 on drive shaft 402, along with alternator winding 406, to provide backup power to modules 302, 308 (in addition to internal or external bus power). Bearings 404 support shaft 402.

While the exemplary preferred embodiments of the present invention are described herein with particularity, those skilled in the art will appreciate various changes, additions, and applications other than those specifically mentioned, which are within the spirit of this invention.

What is claimed is:

1. A dual ignition system comprising:
    a control panel situated in an aircraft cockpit;
    a left ignition element including a primary ignition mode module and a secondary ignition mode module;
    a right ignition element including a primary ignition mode module and a secondary ignition mode module;
    wherein all of the ignition mode modules are electronic;
    a switch mechanism connected between the control panel and the ignition elements, the switch mechanism configured to select either the primary ignition mode module or the secondary ignition mode module for the left ignition element and either the primary ignition mode module or the secondary ignition mode module for the right ignition element;
    wherein a pilot can select primary ignition mode or secondary ignition mode for the left ignition element and primary ignition mode or secondary ignition mode for the right ignition element by operating the switch mechanism from the control panel; and
    wherein the primary ignition modes and the secondary ignition modes are all operational.

2. The dual ignition system of claim 1 further comprising independent electronic sensors for detecting engine drive shaft position for each mode module.

3. The dual ignition system of claim 1 wherein a primary module comprises a fixed ignition circuit and a secondary module comprises a variable ignition circuit.

4. The dual ignition system of claim 3 wherein the fixed ignition circuit comprises a sense magnet responsive to a drive shaft and a sensor cluster activated by the sense magnet and configured to provide an ignition signal.

5. The dual ignition system of claim 4 wherein the sensor cluster comprises hall effect sensors.

6. The dual ignition system of claim 3 wherein the variable ignition circuit comprises a sense magnet responsive to a drive shaft and a position encoder activated by the sense magnet and configured to provide an ignition signal.

7. The dual ignition system of claim 3 wherein the variable module includes circuitry configured to set a high-power boundary of a variable firing range and a cruising power boundary of the variable firing range.

8. The dual ignition system of claim 3 wherein the sense magnet of the fixed module and the sense magnet of the variable module are common.

9. The dual ignition system of claim 3 further comprising a power and positioning device which implements the sense magnets as a single magnet adjacent to an engine drive shaft and further comprising power supply magnets attached to the drive shaft and an alternator winding configured to provide power to the modules.

10. The dual ignition system of claim 3 further comprising independent electronic sensors for detecting engine drive shaft position for each mode module.

11. The dual ignition system of claim 1 further comprising a power and positioning device which implements the sense magnets as a single magnet adjacent to an engine drive shaft and further comprising power supply magnets attached to the drive shaft and an alternator winding configured to provide power to the modules.

12. The dual ignition system of claim 2 wherein a sensor for detecting engine drive shaft position comprises a sense magnet attached to the drive shaft.

13. The dual ignition system of claim 2 wherein a sensor for detecting engine drive shaft position comprises a sense magnet attached to a geared extension of the drive shaft.

14. The dual ignition system of claim 10 wherein a sensor for detecting engine drive shaft position comprises a sense magnet attached to the drive shaft.

15. The dual ignition system of claim 10 wherein a sensor for detecting engine drive shaft position comprises a sense magnet attached to a geared extension of the drive shaft.

* * * * *